Dec. 21, 1926.
H. SCHINDLER
CLARINET
Filed Dec. 23, 1925
1,611,382
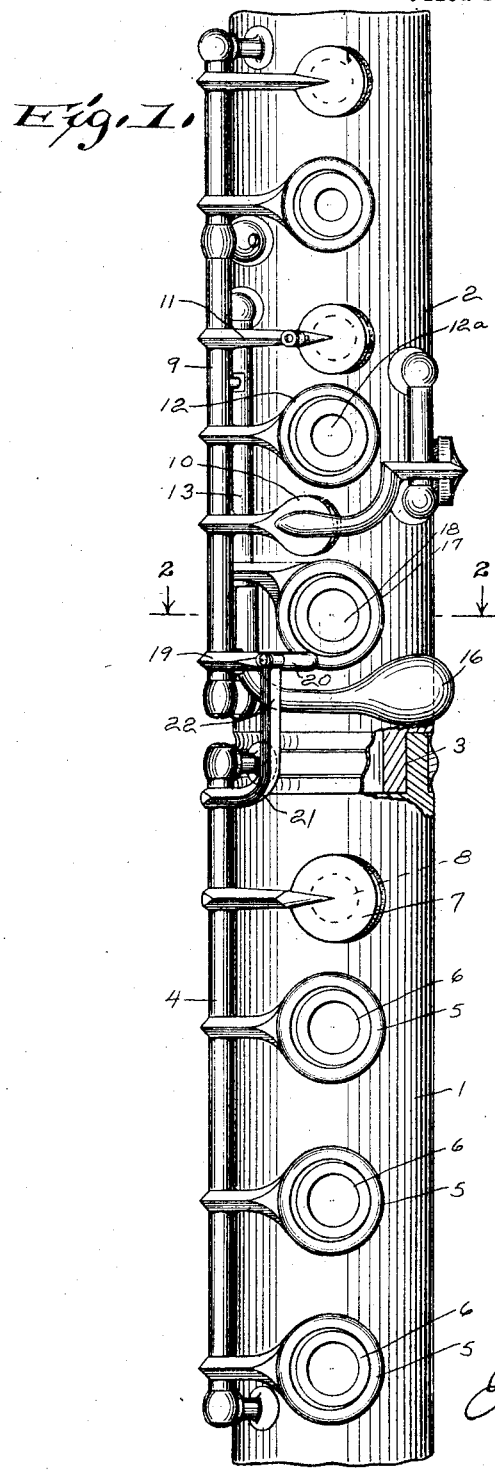
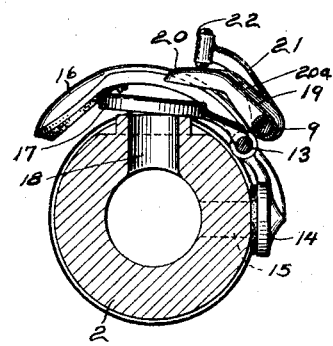
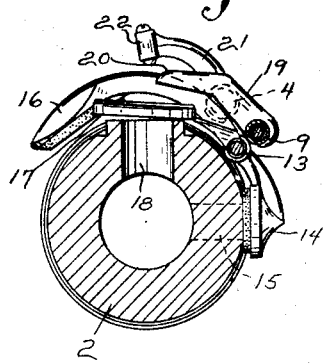
INVENTOR.
Herman Schindler
BY
Erwin, Wheeler & Woolard
ATTORNEYS.

Patented Dec. 21, 1926.

1,611,382

UNITED STATES PATENT OFFICE.

HERMAN SCHINDLER, OF MILWAUKEE, WISCONSIN.

CLARINET.

Application filed December 23, 1925. Serial No. 77,410.

This invention relates to improvements in clarinets.

It is an object of this invention to provide for a clarinet having a cylindrical tube divided in two portions each carrying key-operating rods, a connector for the rods comprising co-operating parts, each part being carried by a corresponding rod and automatically engageable with the other part by relative rotation of the cylindrical portions and without directly manually manipulating either of the connector parts into operative engagement with each other.

In the drawings:

Fig. 1 is a fragmentary view of a clarinet with a portion shown in longitudinal section.

Fig. 2 is a cross section of a clarinet tube taken substantially on the line 2—2 of Fig. 1.

Fig. 3 is a view similar to Fig. 2 showing the connectors as they appear before operative engagement.

Like parts are identified by the same reference characters throughout the several views.

The clarinet tube comprises a lower note section 1 and an upper note section 2. The tube sections 1 and 2 are each shouldered for inter-engagement at 3 as clearly shown in Fig. 1. Mounted upon the tube section 1 is an oscillatable rod 4 having secured thereto finger rings 5 each disposed about finger holes 6 in the tube section 1, and having also secured thereto key disk 7 co-operating with keyhole 8 in tube section 1.

Mounted for oscillation upon the tube section 2 is a rod 9 which carries key disk 10, arm 11 and a key ring 12 co-operating with keyhole 12ᵃ in the tube section 2. Mounted beneath the oscillatable rod 9 upon tube section 2 is a second oscillatable rod 13 carrying key disk 14 co-operating with keyhole 15. For manually operating the oscillatory rod 13 a lever 16 is provided. Rod 13 also carries a finger ring 17 which co-operates with fingerhole 18 in tube section 2.

The oscillatable rod 9 has secured thereto an arm 19 having a portion projecting substantially radially of rod 9 and a portion 20 disposed at an angle obtuse relative to the portion 20ᵃ of said arm to provide a bearing face beveled relative to portion 20ᵃ. Upon the rod 4 is secured a right angle lever or arm 21 having a portion projecting substantially radially of the rod 4 and a portion 22 extending longitudinally of the clarinet and provided with its free end positioned normally above the arm 19 upon rod 9.

The invention is wholly in the connector arms 19 and 21. They are so arranged that when tube sections 1 and 2 are being secured together at 3, the levers 19 and 21 will be substantially in their relative positions shown in Fig. 3. The tube sections will then be rotated relative to each other to bring the levers into their relative positions shown in Figs. 1 and 2. Thus when the arm portion 22 of lever 21 is brought into contact with the bearing face 20 of arm 19 it will ride upon such bearing face until the proper adjustment is made between the tube sections. It will be noted that there are no parts that will wedge or bind with each other when placing the tube sections in proper alignment. Each part of the connector for the rods 4 and 9 is so designed as to permit one to ride upon the other when rotating the tube sections. No direct manual manipulation of either of the arms 19 and 21 is necessary for the purpose of properly connecting these arms.

Briefly describing the operation of the device: When a finger ring 5 or key disk 7 are pressed down by an operator, the rod 4 will be rotated and carry arm 21 downwardly, which arm 21 will in turn move the arm 19 downwardly. Arm 19 being secured to rod 9 will cause such arm to rotate and carry finger ring 12 and key disk 10 therewith. Thus motion may be transmitted from rod 4 through the arms 21 and 19 to the rod 9. When the rod 9 is rotated by a player pressing upon finger ring 12 or key disk 10, the rotation of such rod will not be communicated to rod 4 for the reason that there is no positive connection between arms 21 and 19 except when arm 21 is being rotated by rod 4.

I claim:

1. In a clarinet, the combination with a pair of cylindrical tubes shouldered for inter-engagement and rotation relative to each other, of a pair of oscillatable rods each carried by one of said tubes, and a pair of arms each carried by one of said rods and oscillatable therewith, one of said arms extending directly about the other of said arms and the last mentioned arm being provided with a bearing face upon which the first mentioned arm may ride when said tubes are rotated relative to each other.

2. In a clarinet comprising a divided cylindrical tube, each of the tube portions being shouldered for inter-engagement with the other and having finger holes and key holes, the combination with a rod carried by one of said cylindrical tube portions and having finger rings co-operating with the finger holes on said tube portion and having also key disks co-operating with key hole on said portion, of a second rod carried by the other of said tube portions and having finger rings co-operating with finger holes on the last mentioned tube portion and having also key disks co-operating with key holes on the last mentioned portion, an arm secured to and projecting radially of one of said rods and having a bearing face extending at an angle obtuse relative to said radius, and a second arm secured to the other of said rods and having a portion extending above the first mentioned arm for contact with said bearing face, whereby said tube portions may be secured together and rotated relatively to engage said arms.

3. In a clarinet comprising a pair of cylindrical tubes shouldered for inter-engagement and for rotation relative to each other, the combination with an oscillatable rod carried by one of said tubes, of a second oscillatable rod carried by the other of said tubes, an arm extending radially of one of said rods and provided with a bearing face angularly obtuse relative to said radius, and a second arm carried by said second rod having a portion projecting radially of said second rod and a portion projecting longitudinally of said tubes, said longitudinally projecting portion being normally disposed above the first mentioned arm and contacting with said bearing face.

HERMAN SCHINDLER.